Oct. 9, 1956   H. P. SPARKES ET AL   2,765,526
METHOD OF MAKING A COMPOSITE CYLINDER
Filed April 1, 1953   4 Sheets-Sheet 2
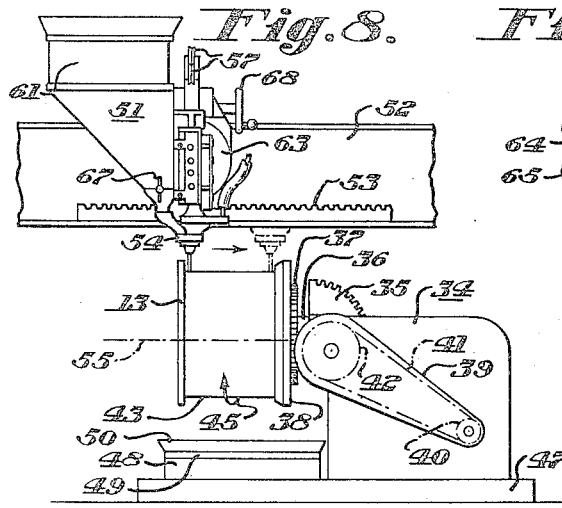
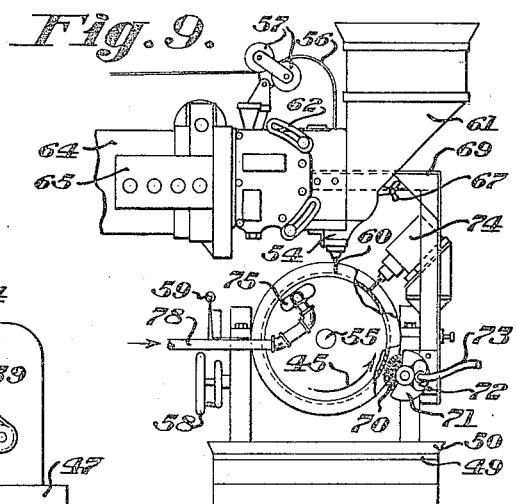
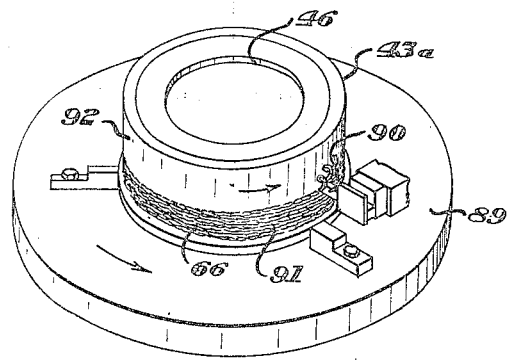
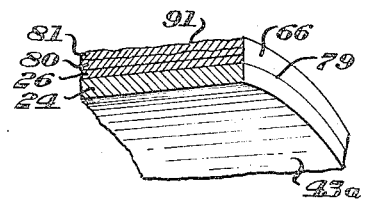
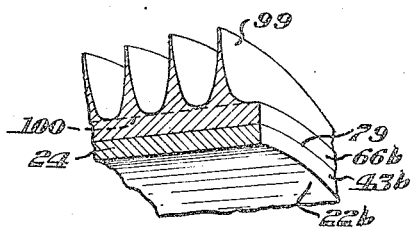
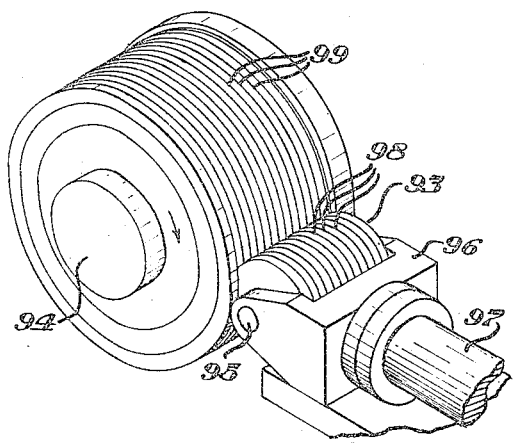
INVENTORS
Harry P. Sparkes,
Joseph G. Ayers &
John G. Newman Oct. 9, 1956   H. P. SPARKES ET AL   2,765,526
METHOD OF MAKING A COMPOSITE CYLINDER
Filed April 1, 1953   4 Sheets-Sheet 3

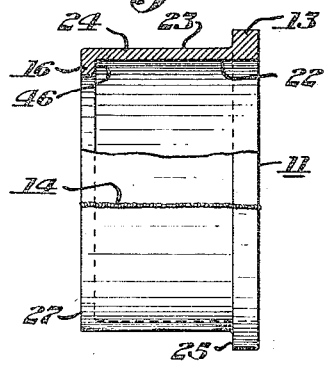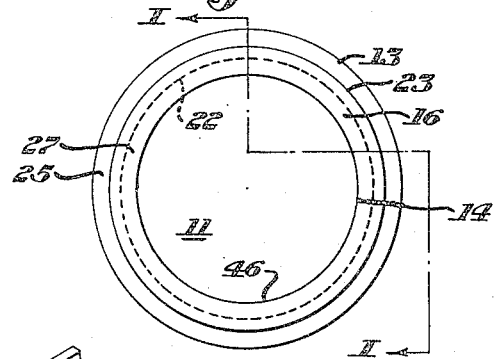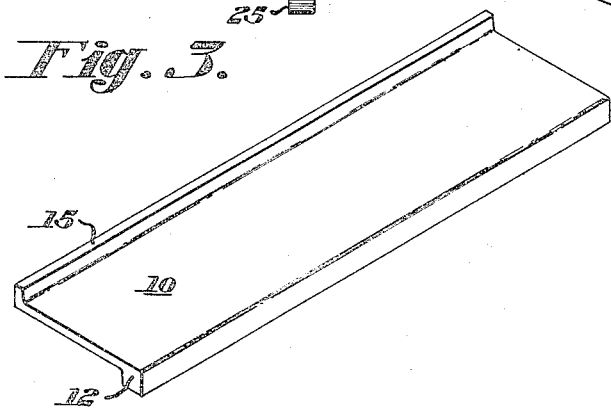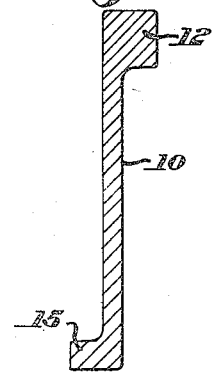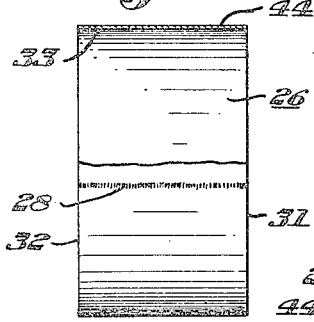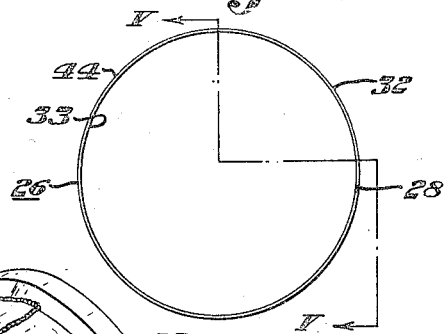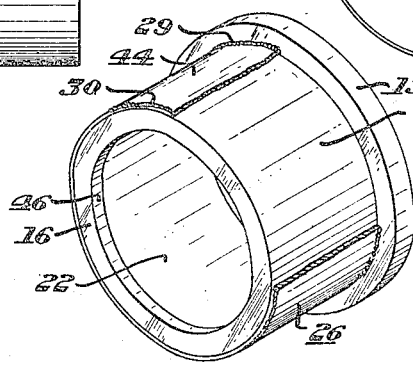

INVENTORS
Harry P. Sparkes,
Joseph G. Ayers &
John G. Newman
*Hoppes, Leonard & Buell*
their attorneys

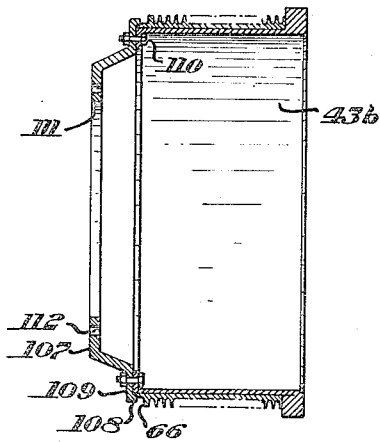
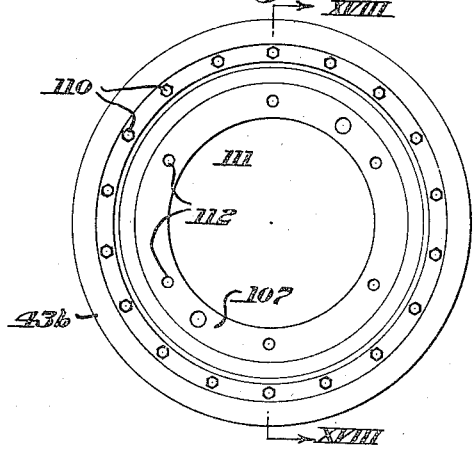
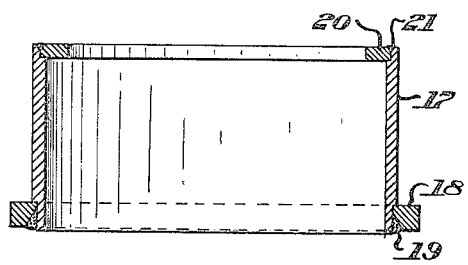
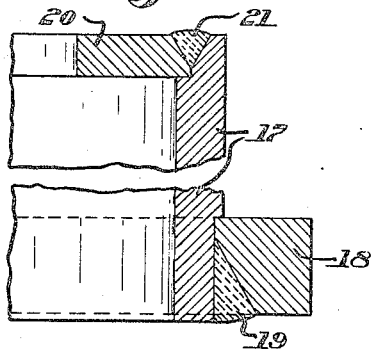
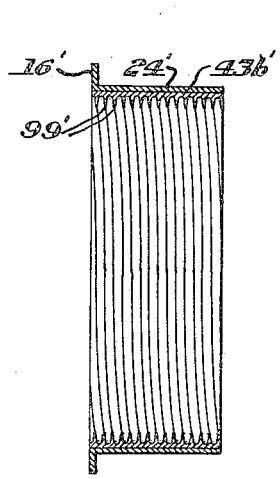
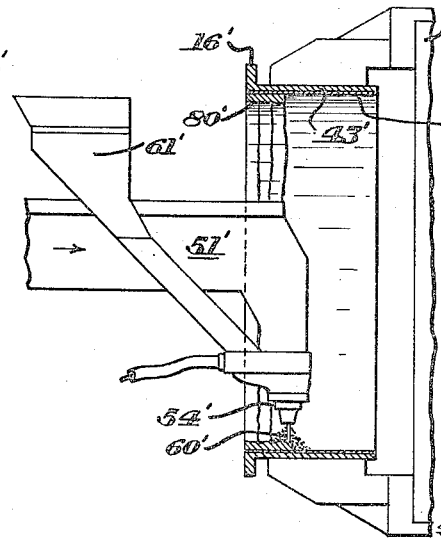

United States Patent Office 2,765,526
Patented Oct. 9, 1956

2,765,526
METHOD OF MAKING A COMPOSITE CYLINDER

Harry P. Sparkes, West Orange, N. J., and Joseph G. Ayers, Mount Lebanon Township, Allegheny County, and John G. Newman, Clairton, Pa., assignors, by mesne assignments, to Copperweld Steel Company, Pittsburgh, Pa., a corporation of Pennsylvania Application April 1, 1953, Serial No. 346,198

18 Claims. (Cl. 29—460)

This invention relates to a novel method of making a composite cylinder, particularly one of ferrous and copper layers bonded uniformly to each other over their interface zone. More especially, this invention pertains to a new method including arc overlay welding for making and controlling the joining of such cylindrical layers. The invention has marked utility in providing, for example, composite steel and copper brake drums, with fins, if desired, shaped in the copper layer.

In the field of brake drums, a conventional metal used in cast iron. Many endeavors have been made to employ steel for that purpose without marked general success. In heavy-duty service particularly, on truck fleets, for example, both cast iron and, to an even greater extent, steel drums when used or tried suffered from a number of shortcomings. Thus, a relatively short life was the rule rather than the exception and many ferrous drums would distort or develop heat checking on the braking face with consequent impairment of the braking function and of the brake linings. Sometimes, in braking heavy-duty equipment with drums constructed by prior methods excessive heat was generated causing brake fading in some cases as a consequence, for example, of the tendency of the drums to enlarge or of the lining to begin to break down or deteriorate. On the other hand, any manufacturer of composite brake drums utilizing a ferrous braking tube and a metal layer of higher thermal conductivity joined thereto encountered a host of problems which maintained the use of all-ferrous brake drums long after composite brake drums as such were known.

Under the present invention, a new method is made available which enables composite brake drums, for example, to be provided which vastly outperform prior brake drums made by earlier methods. Further, such composite brake drums made by the new method of this invention are able to successfully compete in the market place even with all-ferrous brake drums. By the new method hereof, a steel brake tube may be satisfactorily employed withous causing, in use, the development of heat checking on the braking face and without distortion of the drum itself produced by the new method. In addition, the new method enables a bond to be provided between steel and copper layers at their interface zone which is controllable so that the joinder is uniform over the area of the interface zone and uniform radially, thereby neither weakening the steel brake tube nor producing excessive iron content in the copper layer. Preferably, fins are provided on the outer surface of the copper layer by rolling with significant saving of that metal. In use, there is not only a vast increase in the life of a composite brake drum made by the new method hereof but there is also a vast increase in the life of the brake linings associated therewith. Another feature of the new method is its flexibility in respect of enabling a plurality of sizes of composite brake drums to be readily constructed, with assurance that in service the old frequency of occurrence of heat checking, drum distortion and brake fading will be drastically reduced or virtually eliminated. In addition, because of the advantages of the new method described herein operation of composite brake drums so made will occur at relatively lower temperatures with less wear on linings and drum and with vastly increased life, safety and economic savings.

Other objects and advantages will be apparent from the following description and from the drawings which are illustrative only in which Figure 1 is a side view, partly in section taken along line I—I of Figure 2, of a brake drum tube which may be used in a practice of this invention;

Figure 2 is an end view of the brake drum tube shown in Figure 1;

Figure 3 is a Z-shape rolled member which may be used in making a brake drum tube such as the one shown in Figure 2;

Figure 4 is an end view of the Z-shape shown in Figure 3;

Figure 5 is a view, partly in section along line V—V of Figure 6, of a copper sleeve fabricated and utilized in a practice of this invention;

Figure 6 is an end view of the copper sleeve shown in Figure 5;

Figure 7 is a perspective view of the copper sleeve of Figures 5 and 6, partly broken away, assembled with and fastened to a steel brake drum tube such as that shown in Figures 1 and 2;

Figure 8 is a view of a subassembly such as that shown in Figure 7 mounted on a rotatable positioner in juxtaposition to a submerged arc overlay welding head, certain equipment parts being omitted for clarification;

Figure 9 is an end view of the set-up shown in Figure 8 with provision for heating and cooling the aforesaid subassembly as desired and for removing fused flux scale produced in a welding step;

Figure 10 is a fragment of the aforesaid subassembly after the copper sleeve has been built up into a copper layer of desired thickness and the steel and the copper layers have been uniformly bonded throughout their interface zone;

Figure 12 is a view of the brake drum shown in Figure 11 mounted on a vertical lathe for preliminary exterior surfacing;

Figure 13 is a view of the brake drum shown in Figure 12 in mounted position for engagement with finning rolls to produce fins in the outer portion of the copper layer of the composite brake drum;

Figure 14 is a fragment of a substantially finished composite brake drum made by a practice of this invention after fins have been rolled therein as shown in Figure 13;

Figure 18 is a side view, in section, taken along line XVIII–XVIII of Figure 19, of the finally finished and drilled brake drum shown in Figure 17 with a wheel adapter fastened thereto;

Figure 19 is an end view of the structure shown in Figure 18;

Figures 20 and 21 illustrate another method of providing a heavy-duty service brake drum tube which may be utilized in a practice of this invention;

Figure 22 is an illustration of a practice of this invention utilized in the making of an externally contracting type of brake drum; and Figure 23 is a side view, in section, of a composite brake drum after construction and finning of the kind shown under construction in Figure 22.

Figure 11:
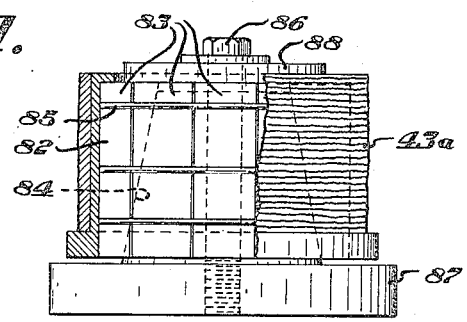
Figure 11 is a view of a brake drum made by a practice of this invention, after copper has been added, which may be engaged by a sizing device in the course of a heat treatment, if desired.

Referring to Figures 1 to 4 of the drawings, a practice of this invention may utilize a ferrous rolled Z-shape 10 which is suitable for heavy-duty service. Shape 10 is bent into cylindrical shape 11 with heavier flange 12 outwardly to form an integral reinforcing ring 13 where the composite brake drum tube 11 is to be utilized with internal expanding brakes on trucks, buses and other heavy-duty automotive vehicles. The ends of shape 10 in the course of being formed into tube 11 are flash butt welded at 14 which completely unites the metal and under present-day joint flash butt welding practice can be done so that very little metal remains to be machined off. In such formation of tube 11, further, flange 15 of shape 10 becomes inwardly extending bolt flange 16. Other modes may be utilized without departing from this invention, in constructing a brake drum tube of ferrous metal, such as steel. Thus, as shown in Figures 20 and 21, a rolled flat strip 17 may be united with a ring 18 by weld metal 19. Similarly, a bolt flange ring 20 may be united with strip 17 after it has been cylindrically formed and the ends thereof welded, to the other end of tube 17 by weld metal 21. Or, if desired, a ferrous brake drum tube may be formed from a rolled L-shape the base of the L being either a reinforcing ring component or a bolt flange ring component, so that only the component not incorporated in the L-shape needs to be welded after the L-shape is formed into a tube, in accordance with the appropriate showing at either end of the tube shown in Figures 20 and 21. Again, a suitable brake drum tube may be made, if desired, beginning with a pierced cylinder in which there is no axial weld joint and rings for the reinforcing ring or the bolt flange ring or both may be fabricated as rings or may be linear strips of suitable cross section which are bent into round form and suitably welded. In that connection, although the embodiment being described employs a reinforcing ring, such rings are particularly useful in heavy-duty service and would not be required with lighter automotive vehicles. In the latter case the brake drum tube would consist of a cylindrical body and a single bolt flange like flange 16.

Following the construction of a suitable brake drum tube, like tube 11 in the rough, tube 11 may be mounted on a vertical turret lathe for rough turning of the surfaces thereof including the bore 22 or face against which a brake lining will act in the embodiment shown in the exterior surface 23 of the body 24 of tube 11. In such machining, surfaces 22 and 23 are maintained concentric and at least surface 23 is at that time given an intermediate finish by machining it while in such concentric relation to bore 22. In addition, discoidal surface 25 of flange 13 is also provided with an intermediate finish by machining. Other modes of accomplishing the respective rough and intermediate finishing operations may be employed as will be understood by those in the art to whom this invention is disclosed.

Generally speaking, steel brake drums have not proven satisfactory. However, a composite brake drum constructed in accordance with a practice in this invention enables a brake drum tube, like tube 11, to be made of steel. Thus, steels of the following ferrous compositions with their alloying constituents appear to be among those which are satisfactory.

| S. A. E. No. | 4320 | 4617 | 8620 |
| --- | --- | --- | --- |
| C | .18-.23 | .14-.19 | .18-.23 |
| Mn | .45-.65 | .45-.65 | .70-.90 |
| Ni | 1.65-2.0 | 1.65-2.0 | about .5 |
| Cr | .4-.6 |  | about .5 |
| Mo | .2-.3 | .2-.3 | about .2 |
| Fe | balance | balance | balance |

After tube 11 is rough turned and intermediately finished as hereinbefore described, a sleeve 26 of copper is placed over surface 23 and generally will extend from face 25 to face 27. Preferably, the copper in sleeve 26 may be phosphorous-deoxidized and be from a non-electrolytic refining process. Sleeve 26 may be made from a flat copper strip or plate formed into the cylindrical shape shown in Figures 5 and 6 and welded along the abutting ends forming joint 28. A suitable weld may be produced using an inert gas shielded arc with standard welding equipment of that character, utilizing copper weld rod of compatible nature to the nature of the copper in sleeve 26. Generally, the inside diameter of sleeve 26 will relatively closely fit against the outside diameter of body 24 so that surface 23 is in juxtaposition to the inside 33 of cylinder 26. Such a subassembly of tube 11 and sleeve 26 may have the sleeve welded to body 24 by welding bead lines 29 and 30 around the edges 31 and 32 respectively. Equipment hereinbelow described may be utilized to form the welds 29 and 30 which hold surfaces 23 and 33 together along those weld lines. The welding line 29 is preferably not joined to flange surface 25 of reinforcing ring 13.

In a practice of this invention being described, a subassembly of a tube 11 with a sleeve 26 thereon may be mounted on a positioner 34. Positioner 34 may comprise a tilting gear 35 supporting an arbor 36 rotatable relative to the axis of arbor 36 by a ring gear 37 fastened to a positioner table 38 at the outer end of arbor 36. A shield 39 may cover a sprocket pinion 40, a sprocket chain 41 and a bevel gear 42 to mesh with ring gear 37. Pinion 40 may be driven at any selected rate of speed by suitable means (not shown) such as a variable speed electric motor to produce a given rotational speed in subassembly 43 comprising tube 11, sleeve 26 and additional copper deposited around the exterior of brake drum subassembly 43 as it is revolved in the direction of the arrow 45. Fastening member 43 to table 38 may normally be done when table 38 is in a horizontal position, dogs and bolts of conventional nature being used to clamp against internal flange surface 46 of the bolt flange 16. After such clamping, a handwheel 58 may be used to turn tilting gear 35 until axis 55 of the brake drum subassembly 43 is horizontal and the speed of rotation of drum 43 may be controlled by a speed control lever 59 connected to the aforesaid motor through suitable electrical or other speed control equipment. Positioner 34 may be mounted on a base 47 and provided with a box receptacle 48 having the top thereof covered by a screen 49 fastened to the bottom of a removable upwardly and outwardly flaring edge 50 fitting around the top edge of box 48.

A welding assembly 51 is supported on a structural traversing rail 52 along which it may move in engagement with a rack 53 fastened to rail 52. In its movement, welding head 54 of assembly 51 moves parallel to the axis 55 of subassembly 43 which axis is coincident with the axis of arbor 36 about which subassembly 43 is rotated by positioner 34 in the course of operation in a practice of this invention being described. Head 54 is so constructed and arranged that a consumable copper wire electrode 56 is unreeled and fed between straightening and feeding rolls 57, the end 60 of rod or wire 56 emerging through a central opening in head 54, the arc by means of which rod 56 is melted and overwelded to the exterior of subassembly 43 existing between subassembly 43 and the tip 60. In the course of such welding, the arc created is submerged by a powdered or granular flux contained in a hopper 61 which flows downwardly around rod 56 and out of head 54 around tip 60 to a sufficient extent to wholly submerge the arc consuming tip 60 and depositing molten copper weld on the exterior of subassembly 43. The vertical center line through tip 60 is positioned on the leading side of a vertical plane through axis 55 as shown on Figure 9. Head 54 may be tilted universally by virtue of the slot and bolt connections 62 and the turnplate connection 63 to the balance of the welding head structure, suitable handwheels or other manipulators being provided to hold head 54 in any position desired. Preferably, for a practice of this invention being described, head 54 is vertical as is tip 60 of the consumable copper rod 56. Rod 56 is of the same nature as the copper in sleeve 26. A laterally extending frame member 64 of assembly 51 carries wires to the motor generator set (not shown) supplying the power for the arc welding operation performed as shown in Figures 8 and 9. Generally, a steady and more constant length of arc appears to be obtainable when using direct current welding equipment. In addition, an electronic tube control for the feeding action of rolls 57 and associated mechanism may be provided which feeds rod 56 in a suitable manner to maintain a relatively unvarying arc character in the course of an operation under this invention.

A switch panel 65 may be used with suitable buttons thereon for controlling the traverse of head 54 along rack 53 in proper speed relation to the speed of revolution of subassembly 43 so that in the building up of a copper layer 66 on a steel layer 24, such copper layer incorporating sleeve 26, the welded band of added copper will be in the form of a helix extending from flange 13 to, in the embodiment shown, face 27 adjoining table 38. The spiral turns of added copper produced by the submerged arc welding step are sufficiently close axially and the pitch of the helix sufficiently small so that no substantial valleys or furrows are present where one turn or band of copper is thus added next to another. It may be that the temperature of the welding operation and other conditions are such that sufficient fusing of the lateral edges of the molten deposit from tip 60 are produced to cause a leveling out of the top surface of the added copper and layer 66 parallel to axis 55 as the welding operation proceeds. Valve 67 at the base of hopper 61 may be used to regulate the flow of flux so that an appropriate quantity without any excess or deficiency flows around tip 60 to submerge the arc and perform the desired fluxing operation. After subassembly 43 is clamped in place and arbor 36 turned into a horizontal position, a handwheel 68 may be used to position assembly 51 in the position shown in Figures 8 and 9 for the start of a copper addition submerged arc welding step, after assembly 51 has been utilized to provide fillet or fastening beads 29 and 30.

As the addition of molten copper proceeds on the exterior of the subassembly of drum 43, the flux concealing the arc between tip 60 and drum 43 may become fused in part and adhere to the outside of the added copper annulus. A cross arm 69 may be connected to movable assembly 51 so that as head 54 is traversed cross arm 69 is moved correspondingly. A wire brush 70 may be mounted on a bracket 71 on cross arm 69 and rotated by a compressed air motor 72 receiving compressed air from a flexible hose 73, the direction of rotation of brush 70 being the same as the direction of rotation of drum 43 with the result that any fused flux will be brushed off the exterior of drum 43 into the confines of the edges 50 on top of box 48. Since fused flux generally will be larger than the unfused granular flux which helped submerge the arc tip 60, unfused reuseable flux will pass through screen 49 into the bottom of box 48 while the fused unreuseable flux flakes will be held on screen 49 in the upper portion bounded by the edges 50, the mesh of screen 49 being properly selected for that purpose. From time to time, box 48 can be removed and the fused flux particles on screen 49 thrown out while the unfused flux in the bottom of box 48 can be returned to hopper 61. An electric or pneumatic axial hammer 74 may also be attached to cross arm 69 to rapidly tap drum 43 and insure the substantially complete removal of fused flux from the annulus or overlay being added on the exterior of drum 43. Because of the traverse of cross arm 69 with head 54, hammer 74 and brush 70 are always operative on the last pitch or turn of the overlay annulus then in the course of being made.

Figure 9A:
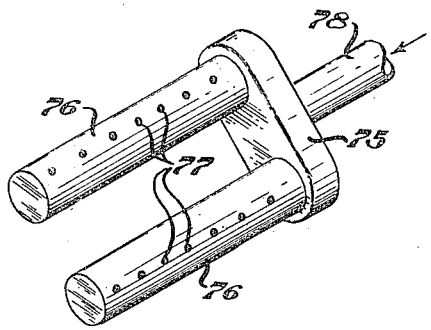
Figure 9A is a detailed view of a distributor for heating or cooling the aforesaid subassembly as desired.
Figure 17:
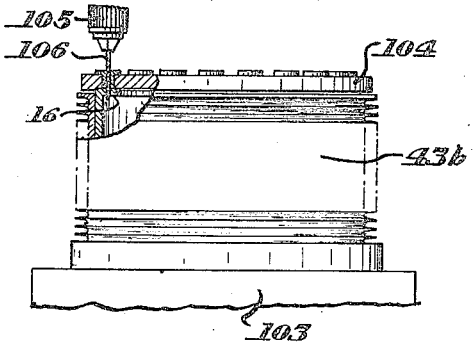
Figure 17 illustrates a jig drilling operation on the bolt flange of the composite brake drum shown in Figures 15 and 16.

As shown in Figures 9 and 9A, a bifurcated distributor 75 constitutes a connecting chamber for two parallel manifolds 76 provided with openings 77 in a row along the surface thereof, which openings 77 communicate with the interior of the manifold 76. A supply pipe 78 may be used to conduct a combustible fuel gas and air mixture into distributor 75 and manifold 76 whenever it may be desired to heat drum 43. Conversely, air or other cooling fluid may instead be forced through pipe 78 so as to flow out through openings 77 against bore 22 whenever it may be desired to cool drum 43. Suitable valves (not shown) are connected between pipe 78 and the respective heating and cooling gaseous sources.

In a practice of this invention, following the above described machining of tube 11 and the fitting thereover of sleeve 26 after removal of any projections inwardly of surface 33 along the weld line 28 by means, for example, of a buffing wheel, such tube and sleeve may be mounted on positioner table 38 as described in connection with Figures 8 and 9. Fuel gas and combustion air or fuel gas alone may be passed through pipe 78 and ignited where the gas issues from the openings 77, which openings as shown in Figure 9 are turned toward the inner surface or bore surface 22 of drum 43. During the heating of drum 43 to a temperature preferably from about 350° F. to about 400° F., drum 43 is rotated by positioner 34 as described. The fuel gas is shut off from pipe 78 when a temperature recording instrument like a contact pyrometer indicates that the preheating of drum 43 before there has been any overlay has been accomplished. Head 54 may be brought into position by movement along rack 53 adjoining table 38 as shown in the solid line outline in Figure 8 and tilted slightly so that tip 60 tends to point away from table 38. Thereupon, the arc may be started and welding line 29 performed straight around edge 31, the traverse mechanism of assembly 51 being thrown out of gear during that welding step. Then, head 54 may be moved to the position shown in Figure 8 in dotted outline and welding bead 30 made while the traversing mechanism of assembly 51 is held out of engagement to permit the bead to follow edge 32 of sleeve 26. When sleeve 26 is thus welded to body 24 along both edges thereof before an overlaying welding step commences, it appears that there is no material axial shrinkage of sleeve 26 and, in addition, there appears to be no interference with the overlay welding operation either in the uniform, level bonding obtained thereby, or, by way of occlusions in the copper layer 66.

To start an arc, after the welding current equipment is turned on, either head 54 may be lowered until tip 60 touches drum 43 and then tip 60 may be retracted, or, a ball of steel wool may be placed with insulated tongs between tip 60 and drum 43 under a flux cover from hopper 61. After the beads 29 and 30 are made, the overlay helix immediately on top of sleeve 26 may be started adjoining bead 29 with the automatic traverse mechanism including rack 53 of assembly 51 in engagement and timed in correlation with the revolutions per minute of drum 43, the rate at which consumable electrode 56 is fed and the desired voltage and current conditions sufficient to yield a uniform, level bond in the interface area where bonding takes place. Such interface area may be thought of as a thin hollow cylinder 79 where surfaces 23 and 33 met before the submerged arc overlay welding step occurred by means of equipment illustrated in Figures 8 and 9. After an overlay helix or annulus is made extending between flange 13 to a point adjacent face 27, or rather between bead 29 and bead 30, the respective surfaces 23 and 33 and the metal immediately adjacent thereto in microscopic radial depth, bond together. Significantly, such bonding occurs even though the arc itself extends between electrode tip 60 and the outer portion of sleeve 26. Thus, it would appear that the arc not only fuses the end of rod 56 as it is being fed downwardly but also makes the portion of sleeve 26 immediately therebeneath and the portion of surface 23 immediately therebeneath molten to a controlled extent which produces bonding of copper to steel and bonding of a copper overlay band or bead to a copper sleeve without excessive radial penetration into body 24 which would weaken it and the strength of the composite brake drum in which tube 11 is used. Further, such a controlled operation also maintains any take-up of iron in the copper at a figure which does not impair the functioning of a composite brake drum made under this invention. Above about .4% of iron in copper within cylindrical interface area 79 the thermal conductivity of the copper layer 66 levels off, relatively speaking. Hence, iron contamination even up to a figure of about 2% iron in copper within annular cylinder 79 and adjacent thereto in layer 66 yields efficient heat equalization around the entire circumference of tube 11 when in service as a part of a composite brake drum with excellent heat dissipation qualities.

It appears that what may happen is that as the assembly 43 rotates, one obtains a constantly moving mold surrounding the axis of tip 60 which allows the metal passing out beyond the mold confinement on the after side of head 54 to solidify effecting the aforementioned bonding while the new unbonded portions of sleeve 26 and tube 11 entering the arc zone begin to melt and bond while retaining their substantial layer identity throughout the relatively short time they are in the molten bond-promoting state. In any event, and without being limited to the statement of theory as to the operation which may take place in the manner of a small confined and constantly moving mold substantially at the very top of a brake drum cylinder being overlaid with additional copper while its axis is generally horizontal, a composite brake drum produced in accordance with this invention does have an interface zone which is level in the sense of being quite precisely parallel to the axis of the brake drum and which, further, is bonded over each unit of area of the interface zone. As a consequence, composite brake drums so produced outlast and outperform all prior brake drums and are enabled to use steel tubes as a part of their construction without producing heat checking or brake fading or drum distortion out of round. In addition, the braking characteristics remain superior and brake linings with composite brake drums produced hereunder outlast and outperform the same brake linings used with prior brake drums.

In a practice of this invention being described, after head 54 makes one axial pass the radial thickness of layer 66 may comprise, for example, the thickness of sleeve 26 plus the thickness of the overlay annulus 80, with, in the embodiment described, a second overlay annulus 81 still to be added. For illustrative purposes only, a faint line is shown on layer 66 in Figure 10 as a possible schematic showing of the exterior surface of sleeve 26 and of the exterior surface of the first copper addition annulus 80, although it will be recognized that in the method of this invention, there are no such surfaces or demarcations because of the welding and fusion which takes place in building copper layer 66 up to the thickness desired by producing one or more overlay annuli of copper on top of and fused to sleeve 26 and to tube 11. Preferably, following the production of the first or innermost annulus layer 80 in the described practice, it may be desired to stress relieve or to heat treat the unfinished composite brake drum 43, particularly in order to take full advantage of the properties of alloy steel when such is used in the making of a tube 11. One mode of such stress relief or heat treating may also employ a sizing fixture 82, of conventional nature. Such a fixture may include separable stave elements 83 expandable under the influence of a pyramidal male expander member 84 engaging correspondingly tapered inner sides on said staves 83. Staves 83 may be held in general assembly arrangement in expander member 84 by split rings 85 in complementary grooves around the exterior of the staves so that when the staves and expanded member are positioned within bore 22, split rings 85 will not engage bore 22. A bolt and nut assembly 86 may have the bolt thereof extend through the center of the expander member 84 so that when bolt assembly 86 is tightened base 87 and a plate 88 tend to move staves 83 in an opposite axial direction to member 84 until sizing device 82 firmly grips drum 43 to hold it, if desired, in correct size and without permitting any distortion of drum 43a to take place in the course of any heat treatment that may be accorded to the drum after one or the other of annuli 80 and 81, in the described practice, is applied. Indeed, any heat treatment and use of a sizing device, if desired, like device 82, may be reserved until drum 43a is completely finished, except that where fins are provided on the completed drum, care must be taken not to mash or otherwise damage such fins or the balance of the copper layer. Regardless of whether a sizing device 82 is employed, it is preferred after each overlay annulus, that drum 43a be slowly cooled, as by being buried in unslaked lime until the temperature of the drum 43a reaches a temperature when so cooled not above about 200 to 300° F. A similar procedure is preferably followed after a second overlay annulus 81 is added. Such slow cooling usually achieves stress relief and for particular services, no heat treatment may be desired. In heat treating, as distinguished from a slow cooling step mentioned herein, a drum 43a might be heated to an approximate hardening temperature in the neighborhood from about 1550° F. to about 1600° F. and held at that temperature for about one hour after which a sizing fixture like fixture 82 may be applied to insure desired dimensioning of drum 43a, following which the fixture and drum can be quenched in oil or other suitable quench medium, after which the fixture can be contracted and the drum removed. An appropriate heat treatment for a particular composition of steel employed in a tube like tube 11 when bonded to copper in the manner disclosed in this invention, will be a subject and understood by those in the heat treating art to achieve desired qualities of hardness, strength and strain-free condition.

Following the completion of the overlay welding step or steps heretofore described, drum 43a may be mounted on a vertical lathe table 89 and rotated to enable tool 90 to turn off any rough or high spots on exterior surface 91. Thereby, a relatively smooth surface 92 is provided against which a gang roller 93 may be pressed to produce fins in the outer portion of copper layer 66. For a finning step, drum 43a may be mounted horizontally on an expanding mandrel arbor 94 and rotated as shown, for example, by the arrow in Figure 13. During such rotation, gang roller 93 may be pressed radially and progressively into outer portion of copper layer 66 through its journal 95 and bracket 96, a thrust rod 97 having mechanism (not shown) for coordinating the radially inward movement of tool 93 with the rotational speed of drum 43a on mandrel 94. Tool 93 comprises a plurality of hardened steel fin rolling disks 98 in side-by-side relation on journal 95. Significantly, such a fin rolling step is economical of metal. It appears that in such fin rolling, the outer portion of layer 66 adjacent surface 92 is displaced substantially in a cold flow manner to form fins 99, the profile of which is chiefly a function of the cross section of disks 98. The metal saving significance by fin rolling may be realized if the blanket portion of layer 66 in Figure 14 is considered the portion between body 24 and the root line 100 of fins 99, and such blanket portion is desired to have a thickness of 3/16 of an inch, fins 99 may have a height, that is a radial dimension from root to crest of about 7/16 of an inch even though the entire thickness of layer 66 from surface 92 to body 24 may be in the order of 5/16 of an inch. Hence, it follows that if fins 99 are machined in a copper layer, that copper layer instead of being 5/16 of an inch thick would have to be 5/8 of an inch thick to obtain the same fin height. Further, interface zone 79 on drum 43b which may be regarded as its datum level reference after a finning step, as shown in Figure 14, is not a true surface but is a thin cylindrical bonding zone equidistant from axis 55 of drum 43b and consists of a level, uniform joint without separation of steel from copper over the entire area of zone 79. Thereby, even if localized heat should develop on braking face 22b, the conducting of that heat to copper blanket 66b where equalization of heat around the entire steel body 24 is substantially instantly performed plus the ready and rapid dissipation of heat by the blanket and more particularly by the fins 99, avoid heat checks, even though body 24 be made of steel, keeps the operating temperatures of the composite brake drums made under this invention lower, prolonging their lives and avoiding the host of difficulties attendant upon prior braking operations, particularly in heavy-duty service.

Figure 15:
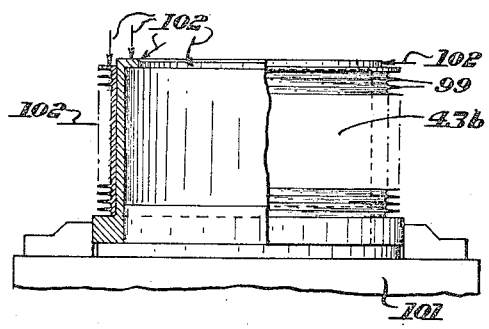
Figures 15 and 16 illustrate finishing steps on the brake drum bore, other edges and surfaces thereof.
Figure 16:
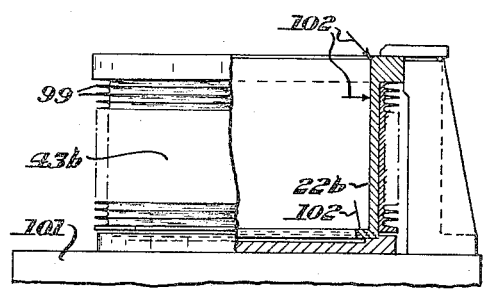

Finishing machining may be performed as shown in Figures 15 and 16 with the brake drum mounted on a vertical lathe table 101 in successive positions shown, the small arrows 102 illustrating the surfaces which preferably are more finely finished before the brake drum is shipped. Such includes surface 22b, the braking face which preferably is provided with a highly smooth finish either by cutting tools or, in some cases, by a grinding operation. After finishing, as shown in Figures 15 and 16, drum 43b may be mounted on a drill press table 103 and a drill jig 104 positioned over bolt flange 16 to enable a drill press head 105 and drill 106 to accurately locate bolt holes through flange 16 around the length thereof generally in equidistant relation to one another. As shown in Figures 18 and 19, a dished steel adapter 107 is selected for the particular wheel construction on which drum 43b is to be employed. Adapter 107 is provided with a cylindrical flange 108 which closely fits over body 24 adjacent face 27, copper layer 66 preferably ending somewhat short of face 27 so that the inner surface of flange 108 may bear against surface 23 between the adjacent end of layer 66 and face 27, thereby helping to concentrically center drum 43b relative to the center of adapter 107. Bolt holes in discoidal flange 109 of adapter 107 register with bolt holes drilled in flange 16 of drum 43b, bolts 110 or other securing devices being used to attach the two members together. In addition, adapter 107 is provided with an inwardly extending discoidal flange 111 which is provided with holes 112 therethrough, which holes will register with the particular wheel on which the particular adapter and brake drum 43b are to be mounted and secured thereto. Although adapter 107 is shown as dish shaped, other forms for particular and differing wheels are provided. In this way, a relatively few brake drum sizes may be employed on a much greater number of different wheels for vehicles.

As an example, and without limitation of this invention thereto, manufacture under a practice of this invention of one of many composite brake drums possible, may be described, omitting any slow cooling and/or heat treating that may be employed as well as fused flux removal, machining and finishing steps hereinbefore described. Thus, in making a composite brake drum with a bore of 16½ inches and an overall width of 8 1/16 inches in the finished state, a steel cylinder with an integral or welded-on reinforcing ring and bolt flange may be machined down an outside diameter on body 24 of 16.875 inches and to an inside diameter of bore 22 of 16.125 inches. A phosphorus-deoxidized copper strip about ⅛ inch thick may be rolled into a cylinder and strapped over the outside diameter of the steel cylinder where the butt joint of the copper strip cylinder may be welded with a silicon-deoxidized copper rod by an inert gas shielded welding method using a tungsten electrode and helium or argon gas for an inert atmosphere. After completion of the copper sleeve cylinder, the overlay welding machine head may be moved into position and tip 60 kept between about 1¼ to 1½ inches on the side of a vertical plane through the axis of the drum counter to the direction in which the drum is rotating. In that position, beads 29 and 30 may be applied to fix sleeve 26 in its relation to the steel tube 11. The drum is rotated by the positioner on which it is mounted at a constant speed under the arc produced between the drum and tip 60, that speed in the example herein given being between about 27½ and 30½ inches per minute linear speed at the periphery of the drum. The traverse of the welding head and of the arc, for the described example, should yield an axial pitch between about .27 and about .33 inch using a copper electrode of 3/16 inch diameter and a flux like "union melt." The speed of the traverse should also be constant and because of the correlation with the rotational speed of the drum will provide overlay spiral bands or beads of weld metal in producing an annulus like annulus 80 in which there will be no undue gaps between the bands in the nature of unfilled valleys nor undue crests, and in addition, the bonding not only to sleeve 26 but the level and uniform bonding of all copper present to the steel tube will also take place in the interface zone 79. On the electrical side, a stable steady arc is desirable and in the given example may constitute a direct current between about 550 amperes and about 610 amperes at a voltage between about 28 and 32 volts. The steel used in tube 11 may be in S. A. E. No. 8620 steel, for example. The electrical conditions should be maintained just as constant as possible to maintain sufficient heat to achieve the extent and character of bonding producible under this invention. In the course of providing two overlay annuli of additional copper to complete a layer 66, in the described example, the drum is preheated to about 350° F. by the burning of gas issuing through manifolds 76, before the actual overlay welding is commenced. During the overlay welding of copper addition steps, compressed air at room temperature is pumped through the manifolds 76 and issues through the openings 77 against bore 22 of the drum to provide a further control in the described practice of this invention. In the described example, the final thickness of layer 66 before finning is about 5/16 of an inch, which after the rolling of fins therein will leave a copper blanket of about 3/16 of an inch thick and fins of about 7/16 of an inch high (measured in a radial direction) bonded to each other and to the steel of the brake drum tube.

Another practice of this invention may constitute a construction of a composite brake drum which is to be employed with a vehicle having external contracting brakes. In Figures 22 and 23, illustrative elements are shown for that purpose, those corresponding generally in construction and function to the described practice above having corresponding reference numerals with the addition to a prime thereto. Although drum 43b' is not provided with any reinforcing ring, because a drum such as that shown in Figure 23 has an added strength factor because of the hoop strength of the steel tube in the composite drum, nevertheless such a reinforcing ring may be added either as an internal or an external flange if so desired, without departing from a teaching of this invention. Further, in the showing of Figures 22 and 23, a finning gang roller may be placed at an angle askew to the axis of angle 43b' so as to roll fins 99' in a spiral or helical manner, the gang roller being suitably traversed relative to drum 43b' in the course of such fin rolling. In addition, an air blast or vacuum equipment may be employed to remove loose flux whether fused or unfused from the interior of brake drum 43b' in the course of the operation shown in Figure 22 in a manner which will not disturb the submergence of the arc by the flux issuing from head 54' around tip 60'. Similarly, cleaning members may be placed inside the interior of subassembly 43' to promptly remove fused flux from the outer side of the overlay annulus, without departing from the teaching of this invention.

Various other modifications and alterations may be made in the steps that the method and practicings taught by this invention without departing from the spirit thereof and the scope of the appended claims.

We claim:

1. In a method of making a composite cylinder, the steps comprising, in combination, assembling a ferrous member having a surface straight in at least one direction in juxtaposition to a dissimilar metal member having an adjoining surface which is at least straight in the same direction, said surfaces defining an interface between said ferrous and dissimilar metal members, positioning an arc on the other side of said dissimilar metal member, moving said arc relative to said members in a continuous path defining an unbroken area overlying said interface, welding addition metal on said other side of said dissimilar metal member with said arc, simultaneously bonding said members together at said interface, and maintaining such relative movement and the characteristics of said arc at correlated values so as to provide uniform bonding over the entire area traversed by said path with said ferrous member remaining generally constant in thickness.

2. In a method of making a composite cylinder, the steps comprising, in combination, assembling a ferrous member having a surface straight in at least one direction in juxtaposition to a copper member having an adjoining surface which is at least straight in the same direction, said surfaces defining an interface between said ferrous and copper members, positioning an arc on the other side of said copper member, moving said arc relative to said members in a continuous path defining an unbroken area overlying said interface, bond overlaying addition copper on said other side of said copper member with said arc, simultaneously welding said members together at said interface, maintaining such relative movement and the characteristics of said arc at correlated values to provide bonding over the entire area traversed by said path, said bonding between said members further maintaining said ferrous member generally constant in thickness, and constructing fins in said addition copper.

3. In a method of making a composite cylinder, the steps comprising, in combination, providing a ferrous tube, forming a cupreous sleeve around said tube in juxtaposition to one of the surfaces thereof parallel to the axis of said tube, welding cupreous addition metal to the side of said sleeve away from said tube to bond said tube, sleeve and addition metal together, and helically moving said tube and sleeve relative to the area of application of said addition metal during such welding.

4. In a method of making a composite cylinder, the steps comprising, in combination, providing a ferrous tube, positioning a cupreous sleeve around said tube in telescoped juxtaposition to one of the surfaces thereof parallel to the axis of said tube, welding cupreous addition metal to the side of said sleeve away from said tube to bond said tube, sleeve and addition metal together, helically moving said tube and sleeve relative to said addition metal as said addition metal is fed during such welding, and controlling said welding to deposit said addition metal and maintain molten metal substantially only along the horizontally upward surface area at the time being of said cupreous sleeve.

5. In a method of making a composite cylinder, the steps comprising, in combination, providing a ferrous tube, providing a cupreous sleeve, placing said tube and sleeve in radial juxtaposition, fastening said sleeve to said tube, mounting and rotating a subassembly of said tube and sleeve, positioning a welding arc head adjacent the uppermost portion of said subassembly feeding cupreous addition metal to said portion during said rotation, welding said addition metal to said subassembly on the side of said sleeve away from said tube, simultaneously bonding said sleeve to said tube, and axially traversing said head during said welding to bond said addition metal to said sleeve and tube in a spiral band over the length of said sleeve.

6. In a method of making a composite cylinder, the steps comprising, in combination, providing a rolled ferrous shape, forming said ferrous shape into a ferrous tube, providing a cupreous sheet, forming said cupreous sheet into a cylinder, welding the axial joint of said cupreous cylinder, positioning said cylinder around said tube, fastening said cupreous cylinder to said tube around at least a portion of one edge of said cupreous cylinder, mounting said tube and cupreous cylinder in a generally horizontal telescoped position, rotating said tube and cupreous cylinder at a predetermined speed, positioning an arc overlay welding head adjacent the top of the subassembly of said tube and cupreous cylinder, said welding head being somewhat to one side of a vertical plane through the axis of said subassembly counter to the direction of rotation of said subassembly, feeding a cupreous rod to supply addition metal through said head during said rotation, and axially traversing said head at a predetermined speed correlated to the speed of said rotation and feeding to weld said addition metal to said subassembly and said cupreous cylinder to said tube.

7. In a method of making a composite cylinder, the steps comprising, in combination, assembling a circular ferrous tube and a circular cupreous sleeve in concentric relation with cylindrical surfaces thereof parallel to the axis thereof and next to one another, simultaneously welding cupreous addition metal to said sleeve with an arc, bonding said sleeve to said tube, rotating said tube and sleeve relative to said arc during said welding at a rate sufficient to maintain a bonded interface zone between said tube and sleeve equidistant from said axis.

8. In a method of making a composite cylinder, the steps comprising, in combination, assembling a ferrous tube and a cupreous sleeve in concentric relation with adjoining surfaces thereof parallel to the axis thereof and next to one another, welding said sleeve to said tube, simultaneously welding cupreous addition metal to said sleeve in a spiral band having its turns laterally fused and relatively level along the outer surface of said addition metal, moving at least said tube and sleeve during said welding steps at a rate sufficient to maintain a bonded interface zone between said tube and sleeve equidistant from said axis.

9. In a method of making a composite cylinder, the steps comprising, in combination, providing a ferrous tube, providing a cupreous sleeve, placing said tube and sleeve in radial juxtaposition, fastening said sleeve to said tube around at least a portion of one edge of said sleeve, mounting and rotating the subassembly of said tube and sleeve, positioning a welding head adjacent the uppermost portion of said subassembly to a side of a vertical plane through the axis of said subassembly counter to the direction of rotation of said subassembly, feeding a cupreous rod for addition metal through said head during said rotation, welding said addition metal to said subassembly on the side of said sleeve away from said tube, simultaneously bonding said sleeve to said tube, axially traversing said welding head during said welding to bond said addition metal to said sleeve and tube in a spiral band over the length of said sleeve, and cleaning the surface of said addition metal following said bonding.

10. In a method of making a composite cylinder, the steps comprising, in combination, providing a rolled ferrous shape, forming said ferrous shape into a ferrous tube, providing a cupreous sheet, forming said cupreous sheet into a cylinder, welding the axial joint of said cupreous cylinder in an inert gas atmosphere, positioning said cylinder around said tube, fastening said cupreous cylinder to said tube around at least a portion of one edge of said cupreous cylinder, mounting said tube and cupreous cylinder in a generally horizontal telescoped position, rotating said tube and cupreous cylinder at a predetermined speed, positioning an arc overlay welding head adjacent the top of the subassembly of said tube and cupreous cylinder, said welding head being somewhat to one side of a vertical plane through the axis of said subassembly counter to the direction of rotation of said subassembly, feeding a cupreous rod to supply addition metal through said head during said rotation, supplying flux around said rod and an arc between said rod and said subassembly during said rotation, axially traversing said head at a predetermined speed correlated to the speed of said rotation during said rotation of said subassembly and of said rod feeding to weld said addition metal to said subassembly and said cupreous cylinder to said tube, and removing substantially all flux from said addition metal following the welding thereof to said subassembly.

11. In a method of making a composite cylinder, the steps comprising, in combination, assembling a cylindrical ferrous tube and a cylindrical cupreous sleeve in telescoped relation, the adjoining surfaces of said tube and sleeve generally defining an interface, rotating said tube and sleeve about a generally horizontal axis, positioning an arc welding head near the other side of said sleeve adjacent one edge thereof, moving said head generally parallel to the axis of said sleeve when an arc has been generated between said head and said sleeve and tube, adding copper addition metal by means of an arc to said other side of said sleeve by means of said head during the relative movements of said head in respect of said tube and sleeve to overlay said sleeve on said other side with a spiral band forming an annulus increasing the radial thickness of said sleeve, and generating sufficient heat by means of said arc to bond said tube and sleeve together at said interface without material diminution of the radial thickness of said tube.

12. In a method of making a composite brake drum or the like, the steps comprising in combination, assembling a cylindrical ferrous tube and a cylindrical cupreous sleeve in telescoped relation, the adjoining surfaces of said tube and sleeve generally defining an interface, fastening said tube and sleeve together rotating said tube and sleeve about a generally horizontal axis, positioning an arc welding head near the other side of said sleeve adjacent one edge thereof, correlatively moving said head generally parallel to the axis of said sleeve when an arc has been generated between said head and said sleeve and tube, adding copper addition metal by means of an arc to said other side of said sleeve by means of said head during the relative movements of said head in respect of said tube and sleeve to overlay said sleeve on said other side with a spiral band forming an annulus increasing the radial thickness of said sleeve, generating sufficient heat by means of said arc to bond said tube and sleeve together at said interface without material diminution of the radial thickness of said tube, the molten state of said metals in said adding and bonding being ambulatory relative to said tube, sleeve and annulus while remaining in a stable generally horizontal position, and heat treating and finishing said cylinder in final form.

13. In a method of making a composite cylinder, the steps comprising, in combination, providing a ferrous tube, providing a cupreous sleeve, placing said tube and sleeve in radial juxtaposition, fastening said sleeve to said tube, preheating said tube, welding cupreous addition metal to the side of said sleeve away from said tube to bond said tube, sleeve and addition metal into a composite cylinder, cooling said composite cylinder from the tube side thereof during said welding, and helically moving said tube and sleeve together relative to said addition metal source during welding.

14. In a method of making a composite brake drum or like cylinder, the steps comprising, in combination, providing a circular steel tube, said tube having a carbon content not to exceed about 0.25 per centum carbon by weight, providing a circular sleeve of deoxidized copper, assembling said tube and sleeve in telescoped relation with adjoining surfaces thereof close to one another, rotating said tube and sleeve together about a generally horizontal axis, arc overlaying the cylindrical surface of said sleeve away from said tube with an addition annulus of deoxidized copper, generating sufficient heat in said overlaying to weld the adjoining surfaces of said tube and sleeve together, and controlling conditions of said overlaying and welding to obtain complete bonding over the entire interface between said tube and sleeve and between said sleeve and annulus with generally uniform depth of interpenetration between the steel in said tube and the copper adjoining said tube.

15. In a method of making a composite brake drum or like cylinder, the steps comprising, in combination, providing a circular steel tube, said tube having a carbon content not to exceed about 0.25 per centum carbon by weight, providing a circular sleeve of deoxidized copper, assembling said tube and sleeve in telescoped relation with adjoining surfaces thereof close to one another, rotating said tube and sleeve together about a generally horizontal axis, preheating said tube at least to about 350° F., arc overlaying the cylindrical surface of said sleeve away from said tube after said preheating with an addition annulus by helically applying a deoxidized copper band, generating sufficient heat in said overlaying to weld the adjoining surfaces of said tube and sleeve together, gently cooling said tube during said overlaying, and controlling conditions of said overlaying and welding to obtain complete bonding over the entire interface between said tube and sleeve and between said sleeve and annulus with generally uniform depth of interpenetration between the steel in said tube and the copper adjoining said tube.

16. In a method of making a composite cylinder, the steps comprising, in combination, providing a ferrous tube, providing a cupreous sleeve, placing said tube and sleeve in radial juxtaposition, fastening said sleeve to said tube, preheating said tube, submerged arc overlay welding cupreous addition metal to the side of said sleeve away from said tube to bond said tube, sleeve and addition metal into a composite cylinder, cooling said composite cylinder from the tube side thereof during said welding, helically moving said tube and sleeve together relative to said addition metal during such welding, and removing fused flux from said addition metal during such relative helical movement.

17. In a method of making a composite cylinder, the steps comprising, in combination, forming a ferrous tube, forming a cupreous sleeve of comparable diameter, placing said sleeve and said tube in radial juxtaposition with one around the other, welding cupreous addition metal around the side of said sleeve away from said tube to bond said tube, sleeve and addition metal together, and displacing metal by radial pressure in the copper layer formed by said sleeve and addition metal to form fins therein.

18. In a method of making a composite cylinder, the steps comprising, in combination, forming a ferrous tube, forming a cupreous sleeve of comparable diameter, placing said sleeve and said tube in radial juxtaposition with one around the other, welding cupreous addition metal around the side of said sleeve away from said tube to bond said tube, sleeve and addition metal together, slowly cooling them following said welding, displacing metal by radial pressure in the copper layer formed by said sleeve and addition metal to form fins therein, and heat treating and sizing said tube and copper layer after said welding.

(References on following page)

References Cited in the file of this patent

UNITED STATES PATENTS

| | | |
|---|---|---|
| 855,239 | Faries | May 28, 1907 |
| 1,628,804 | Price | May 17, 1927 |
| 2,108,409 | Peron | Feb. 15, 1938 |
| 2,182,238 | Rasmussen | Dec. 5, 1939 |
| 2,442,446 | Wallace | June 1, 1948 |
| 2,515,097 | Schryber | July 11, 1950 |
| 2,600,630 | Fergusson | June 17, 1952 |

FOREIGN PATENTS

| | | |
|---|---|---|
| 111,528 | Australia | Sept. 26, 1940 |
| 673,885 | Great Britain | June 11, 1950 |